United States Patent [19]

Villella

[11] 3,739,756

[45] June 19, 1973

[54] INTERNAL COMBUSTION ENGINE

[76] Inventor: Tony R. Villella, 4701 Viewdrive, Everett, Wash. 98201

[22] Filed: May 10, 1971

[21] Appl. No.: 141,669

Related U.S. Application Data

[63] Continuation-in-part of Ser. No. 847,181, Aug. 4, 1969, Pat. No. 3,599,612.

[52] U.S. Cl........... 123/44 C, 123/44 D, 123/119 A
[51] Int. Cl............................................. F02b 57/06
[58] Field of Search..................... 123/119 A, 44 C, 123/44 R, 44 A, 44 D; 60/278

[56] References Cited
UNITED STATES PATENTS

| | | | |
|---|---|---|---|
| 1,933,619 | 11/1933 | Edwards.................. | 123/119 A UX |
| 3,470,857 | 10/1969 | Stivender........................ | 123/119 A |
| 3,599,612 | 8/1971 | Villella.......................... | 123/44 C X |

Primary Examiner—Carlton R. Croyle
Assistant Examiner—Michael Koczo, Jr.
Attorney—Christensen & Sanborn

[57] ABSTRACT

This application discloses a novel internal combustion engine incorporating the advantageous features of two cycle and four cycle engines in a single simplified engine. A stationary vertical crankshaft and a cylinder block disposed for rotation about the crankshaft are disclosed. Cylinder sleeves disposed in the rotatable block assembly include intake and exhaust ports which are substantially diametrically opposed with the valve action being controlled by the position of the piston within the cylinder sleeve in combination with nonrotative upper and lower intake and exhaust control plates. In one embodiment fuel as well as air for combustion and scavenging of the combustion chamber is provided by a blower system cooperating with a rotating blower ring attached to the block assembly. In another embodiment full injection is used. The engine includes a combustion chamber associated with each piston and also a secondary burning chamber which is opened at a predetermined point in the travel of each piston so that an additional charge of oxygen is applied to the combustion chamber after the main combustion has taken place. In another embodiment a tunable exhaust system is disclosed with portions of the exhaust being directed back to the cylinder intake for reburning. Construction details of the complete engine, the novel power transfer assembly for driving a vehicle, and a fuel injection system are disclosed.

15 Claims, 7 Drawing Figures

Patented June 19, 1973

INVENTOR
TONY R. VILLELLA
BY
Christensen & Sanborn
ATTORNEYS

INVENTOR
TONY R. VILLELLA
BY
Christensen & Sanborn
ATTORNEYS

Patented June 19, 1973

INVENTOR
TONY R. VILLELLA
BY Christensen & Sanborn
ATTORNEYS

INTERNAL COMBUSTION ENGINE

REFERENCE TO OTHER APPLICATIONS

This application is a continuation-in-part of my application Ser. No. 847,181 filed on Aug. 4, 1969, now U.S. Pat. No. 3,599,612, and having the same title as this application. That application is hereby incorporated by reference into the present application and constitutes part of the disclosure hereof.

Since the advent of internal combustion engines a great deal of time, effort and money has been devoted to simplifying such engines and to improving the efficiency thereof while reducing the weight for a given power output. Two cycle engines of the stationary crankshaft type are well known in the art with most such engines utilizing oil carried by the combustion mixture for lubricating the bearing assemblies through the use of an arrangement wherein the fuel traverses the crankcase before entering the combustion chambers. The wasteful nature of prior art two cycle engines based on blower arrangements for clearing the combustion chamber following each power cycle as well as the problems associated with fouling of spark plugs are so well known as to require no further elaboration herein.

Four cycle engines have met with far greater success in most applications, and particularly in the automotive industry, but have the inherent disadvantage of requiring two complete cycles of piston travel to obtain a single power stroke. The comparative advantages of the four cycle engine as contrasted to prior art two cycle engines are also well known. Both types of engines are known to produce substantial volumes of air contaminants as a result of the inefficient and incomplete burning of the initial fuel as well as through the production of undesirable combustion by-products such as carbon monoxide. The increased concern about such air contamination and the desire of engine manufacturers to provide engines having a high horsepower-to-weight ratio has resulted in many engines being more complex. This is particularly true in the area of carburetion and valve assemblies for these engines together with the crankcase venting systems for burning the combustion by-products which previously entered the engine crankcase and then were permitted to escape to the atmosphere.

It is an object of the present invention to provide a simplified internal combustion engine incorporating many of the advantageous features of both two cycle and four cycle engines while simultaneously avoiding and eliminating some of the deficiencies of each of these two types of engines encountered in the prior art. Another object of the present invention is to provide a compact and greatly simplified internal combustion engine.

Another object of the present invention is to provide a highly efficient internal combustion engine whose combustion byproducts include a greater proportion of carbon dioxide and a smaller proportion of carbon monoxide than has been provided by prior art engines.

Another object is to provide a novel internal combustion engine having a tunable exhaust system with a selected portion of the exhaust being recycled through the combustion chambers.

Another object is to provide a novel fuel injection system for an internal combustion engine.

Additional objects of the invention relate to specific improved components within the overall engine assembly which permit the fabrication and assembly of the engine using a relatively small number of components which can be assembled or disassembled in a short time.

The above as well as additional objects and advantages of the invention will be more clearly understood from the following description when read with reference to the accompanying drawings wherein.

Figure 1:
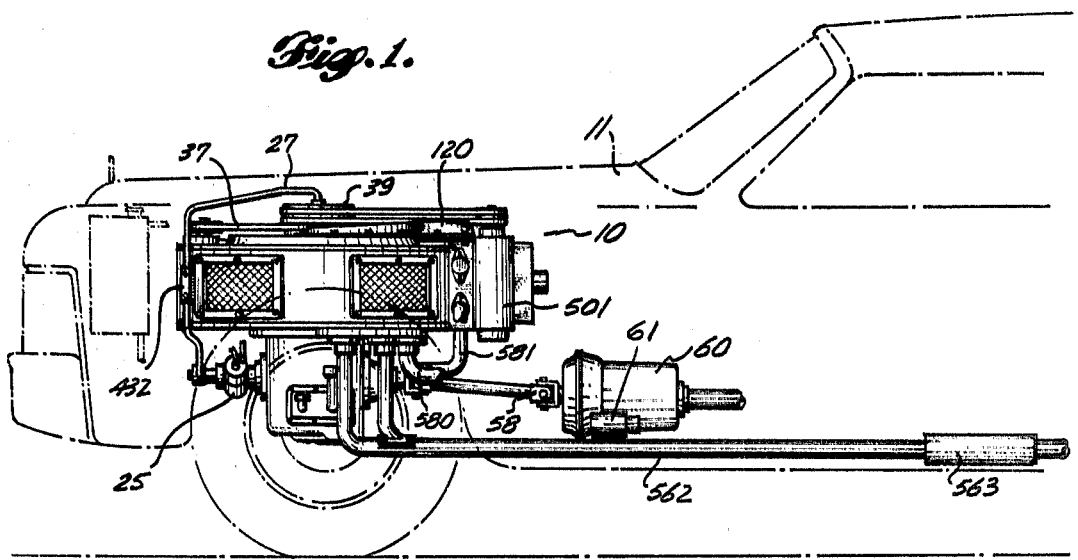
FIG. 1 is an elevation view of the novel engine disposed within an automobile and having a power transfer case and transmission assembly illustrated in combination with the engine.

The engine shown in the drawings described briefly above corresponds in most details to the engine shown in the above-referenced and incorporated patent application. An area of difference is that the present engine includes exhaust feedback loops for directing engine exhaust into the engine intake for recycling thereof.

Figure 2:
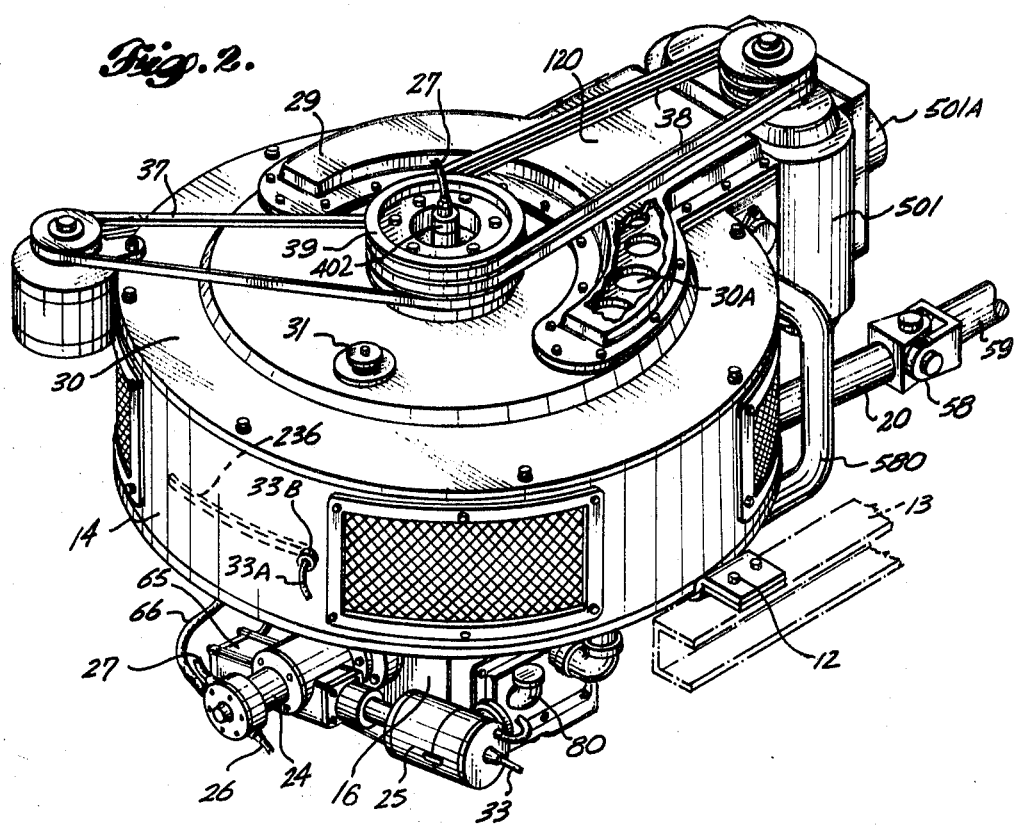
FIG. 2 is a perspective view of a preferred embodiment of the engine of the present invention.

Turning now to the drawings and in particular to FIGS. 1 and 2, the assembled engine 10 is illustrated as being mounted in the front end of a vehicle 11 by means of the support brackets 12 bolted to the vehicle frame 13. The engine has a stationary crankshaft 15 (FIG. 6) which is rigidly bolted to the crankcase 16 and is further held against rotation by means of a splined shaft which fits into a mating opening in the lower end of the crankshaft. The crankshaft has a horizontal bore therein through which the power output drive shaft 20 extends. The shaft 20 has a gear secured thereto, the front end of shaft 20 being supported for rotation by a bearing in the front wall of the crankcase and the rear portion of the shaft is similarly supported by the bearing in the rear wall of the crankcase.

The front end of the shaft 20 is coupled with and drives the fuel pump 24 and is also geared to the distributor 25. Fuel line 26 (FIG. 2) carries fuel to the pump 24 with line 27 extending from the high pressure side of the pump to the fuel injection nozzle 402 located at the top center of the engine. The fuel flow control valves 432 are located on the front wall of the engine in FIG. 1 but not seen in FIG. 2. The blower manifold 29 is bolted to the top plate 30 of the engine housing 14, said top plate of the engine housing having a blow-back valve assembly 31 located therein. The holes 30A in the plate 30 are the entrance openings for air to the cylinders, as will be described hereinafter.

Electrical lead 33 extends from the distributor 25 to a high voltage coil (not shown) supported on the side of the housing 14 with the output lead 33A from the coil extending to the ignition ring connector 33B. As seen in FIG. 10A of the above-identified application, an ignition ring 236 is positioned to engage the end of a spark plug 330. A plurality of conventional drive belts 37 and 38 are shown in FIG. 2 as being engaged with the drive pully 39 which is bolted to the upper main bearing member of the engine. Belt 37 drives an alternator and belts 38 drive an air blower 501 mounted on the rear of the engine.

A starter motor 61 is shown in FIG. 1 as being positioned on the bottom of the transmission 60 for selectively applying starting torque to the engine. It will be obvious that various types of starting arrangements can be provided for starting the engine by imparting initial rotational energy to the block assembly.

The preferred embodiment of the present invention makes use of a pressurized oil system for lifting oil from the crankcase and applying the same to the various components of the engine and thus an oil pump 65 is shown as being coupled with the front end of the power output shaft 20. Oil line 66 extends from the pump to a fitting on the lower portion of the crankshaft 15. The crankshaft 15 is provided with a main central bore which communicates with various fittings so that pressurized oil is forced up through the center of the crankshaft for application to the bearing assemblies and other surfaces requiring lubrication. An oil filler pipe 80 is seen in FIGS. 1 and 2.

Figure 6:
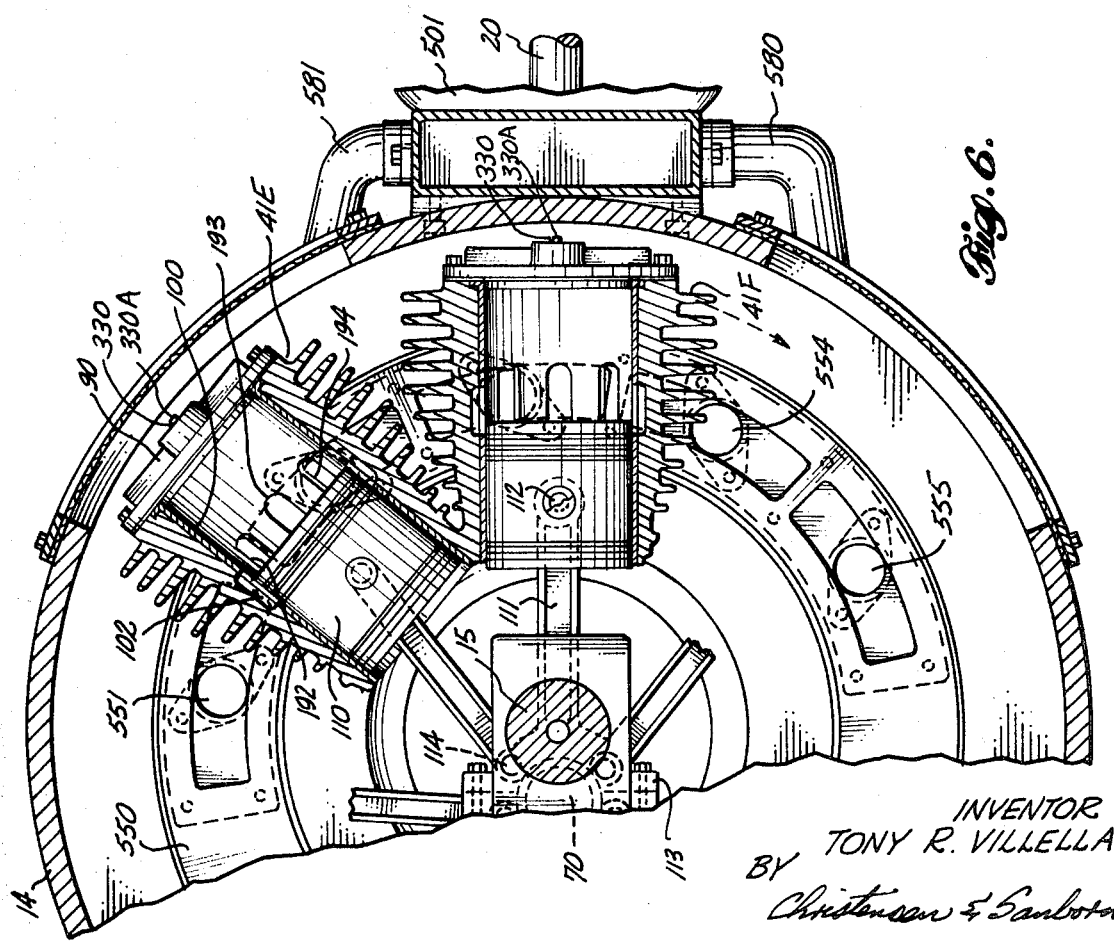
FIG. 6 is a plan view of the lower bearing and exhaust plate together with two pistons showing the exhaust cycle.

The preferred embodiment of the invention has seven cylinders. Thus the cylinder block 41 includes seven individual radial cylinder assemblies labeled 41A-41G in my above-identified application. Assemblies 41E and 41F are seen in FIG. 6 herein. Individual cylinder heads 90 are bolted to the ends of the cylinder assemblies with the head members 90 and the individual cylinder assemblies being provided with a plurality of cooling fins. While the block assembly 41 could be made from a plurality of individual components, the main block 41 of one engine constructed in accordance with the teachings of the present invention was a single-piece aluminum casting machined in the manner indicated in FIGS. 3 and 6. Each cylinder assembly includes a single intake port opening 91 on the upper surface thereof and three elongated exhaust ports in the lower portion thereof.

Each of the radial bores in the cylinder block has a ported cylinder sleeve 100 disposed therein (FIG. 6). Each cylinder sleeve 100 has three exhaust ports 192, 193 and 194 disposed in the lower surface thereof for alignment with the exhaust ports in the cylinder block. In approximate circumferential alignment with the exhaust ports 192, 193 and 194 the cylinder sleeves 100 are provided with a plurality of elliptical intake ports 101. The cylinder block is provided with an enlarged circumferential groove 102 in each of the cylinder walls with the enlarged groove 102 being aligned with the intake and exhaust openings 101 and 192-194 in the cylinder sleeve 100. Thus during the application of air from the blower in the manner described hereinafter, the air is applied to the cylinder throughout the major portion of the circumference thereof and hence charging and scavenging of the cylinders is greatly enhanced. To further enhance charging and scavenging of the cylinders, the intake and exhaust openings 101 and 192-194 in sleeves 100 are cut at an angle through the wall of the sleeve. As a result the purging air is directed toward the head end of the cylinders for a more thorough filling and cleansing of the cylinders.

Each cylinder sleeve 100 has a piston 110 disposed therein. Connecting rods 111 and wrist pins 112 connect the pistons with the single journal 70 on the crankshaft via the main bearing hub 113. Wrist pins 114 connect the central ends of connecting rods 111 with the hub 113. The pistons 110 are provided with the usual sealing and scraping ring assemblies.

A blower ring assembly 115 is bolted to the cylinder block on the upper surface thereof and serves to ram the air available from the intake manifold housing 29 through openings 30A into the individual cylinders at the appropriate time. The blower ring includes a horizontal ring section having upstanding walls 116 and 117 formed integrally therewith. Seven separate compartments are provided in the blower assembly with separating walls between adjacent compartments being angled so that when the blower ring is rotated in a clockwise direction air will be scooped from within the manifold housing 29 and forced downwardly against the cylinder block and hence into the cylinders.

In the embodiment of the invention shown in FIGS. 1-7 the spark plugs 330 are provided with a hemispherical cap which is aligned with the spark commutator ring 236. The conductive ring 236 is mounted by an insulating member in the front wall of the engine housing. It will be seen that the front portion of the engine housing includes the solid wall in the forward position for holding the conductive commutator ring 236, the housing further including the screen assemblies in the side walls thereof as shown in FIGS. 1 and 2. The coil wire 33A is connected to the commutator ring 236 for applying the necessary high voltage thereto at the appropriate time during the cycle as determined by the distributor 25. It has been found in practice that it is not necessary for the heads 330A of th spark plugs 330 to physically contact the commutator ring 236 since the voltages involved are sufficiently high to jump a small gap. Hence lubrication is not required and yet efficient engine operation is assured by having the cap 330A in close proximity to the ring 236 as the cylinder block rotates.

Figure 3:
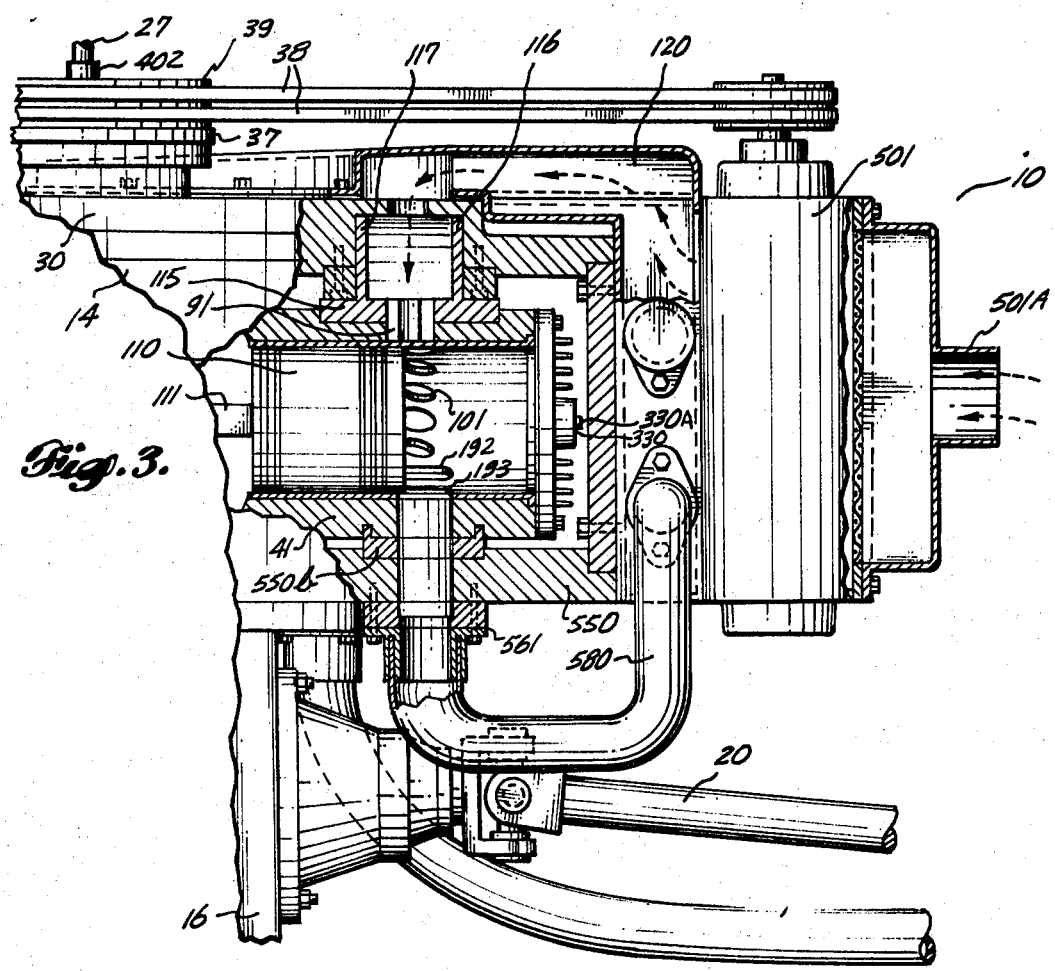
FIG. 3 is a vertical sectional view of the rear portion of the engine.

The bottom plate 550 (FIG. 4) is provided with a plurality of sealing grooves 550A which mate with the cylinder block to act as oil seals. Main sealing ring assembly 550B is secured to the lower plate 550 to further seal the opening between the cylinder block and the lower plate 550. The sealing ring 550B is made of a metal bearing material so that it acts as a seal and as a bearing. An outer cylindrical seal is also secured to the outer edge of the plate 550. The plate 550 of the present embodiment is provided with five exhaust openings 551, 552, 553, 554 and 555. As seen in FIGS. 1 and 3 each exhaust opening has an exhaust manifold 561 bolted to the bottom of the plate 550 covering the associated opening. Individual exhaust pipes then lead either to the blower 501 or to the main exhaust pipe 562 having a muffler 563 attached thereto. As seen in FIG. 5 the bottom of plate 550 is tapped adjacent holes 551-555 to receive the bolts 565 and 566 which hold the manifolds to the plate. As explained below, a given manifold and exhaust pipe can be removed and replaced by a plug plate 567 (FIG. 5) so that a given exhaust port 551-555 is not used. This permits an actual tuning of the exhaust cycle in the manner described below.

As described in detail in the above-identified patent application, the crankshaft 15 is held stationary. The block assembly and components carried thereby rotate about the stationary crankshaft. As the block assembly rotates the pistons in the individual cylinders move inwardly and outwardly since they are connected to the journal 70 on the crankshaft. The blower ring assembly 115 assists in ramming air from the blower 501 into the cylinders at the proper time. This air is applied to the cylinders when the individual pistons 110 uncover the intake openings 101 in the associated sleeves 100. Thus it will be seen that the blower 501 together with the blower ring 115 causes each cylinder to be purged of combustion products and to be provided with oxygen for the explosion of the next power stroke. In one embodiment of the invention fuel is applied to the cylinders via the intake manifold by a single nozzle.

The engine is adapted for two types of operation having advantages over engines in the art. By having the exhaust ports in the cylinder wall open and expose the combustion chamber to an increased volume prior to alignment with the holes in the exhaust manifold a secondary burning is achieved after the main combustion cycle has been completed. This is described in detail in said copending application and results in improved engine operation. The second manner of operation involves diverting a selected portion of the combustion products back to the intake manifold. This selected portion will then be recycled through the engine and hence a portion of the unburned combustible material from a previous cycle will be burned.

Figure 4:
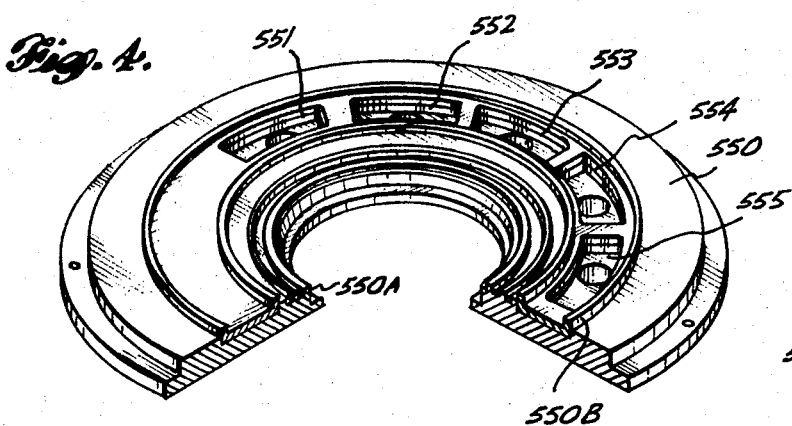
FIG. 4 is a perspective view of the lower bearing and exhaust plate with a portion cut away to show construction details.
Figure 5:
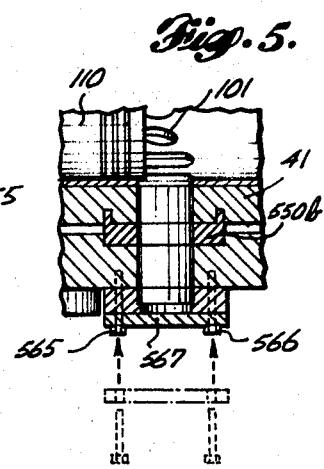
FIG. 5 is an enlarged cross-sectional view of a portion of the exhaust system showing the plate used for blocking a given port for tuning the engine exhaust.

As seen in FIGS. 1, 3 and 4 individual exhaust manifolds and individual exhaust pipes are connected to the five exhaust ports 551-555 in the plate 550. With the engine set up in the manner illustrated herein combustion products from exhaust ports 551 and 555 are diverted back to the intake manifold rather than being directed to the exhaust pipe 562 for discharge to the atmosphere. Thus it will be seen in FIG. 3 that the short exhaust pipe 580 connected to the exhaust manifold 561 covering exhaust port 555 leads to the output side of the blower 501. Similarly, the exhaust pipe 581 leading from the exhaust port 551 goes directly to the output side of the blower 501. Fresh air enters blower 501 through the pipe 501A after having passed through an air cleaner.

When the piston 110 in a given cylinder first uncovers the exhaust openings in the cylinder wall, the cylinder will be generally aligned with the exhaust port 551. This is illustrated in FIG. 6, wherein it will be seen that the cylinder 41E has just passed the exhaust port 551. The exhaust openings 192-193 and 194 in the cylinder wall are radially aligned with the rectangular openings in the plate 550 which communicate with the main exhaust ports 551-555. Thus when the piston uncovers the openings 192-194 the exhaust cycle begins so long as an exhaust port 551-555 is aligned with openings 192-194. In FIG. 6 the cylinder 41E is disposed beneath the air intake manifold 29. Thus the pressurized air from the blower and blower ring forces fresh air in and the combustion products out through the exhaust port 551. However since the exhaust port 551 is coupled with the output side of the blower 501, it will be seen that the combustion products passing through port 551 will be directed back into the cylinders being charged with air for a new power stroke. As a result a portion of the combustion products will be recycled and burned.

Figure 7:
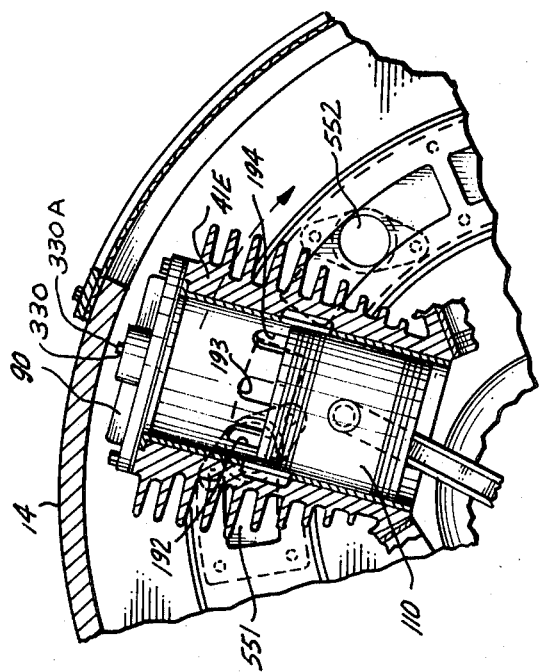
FIG. 7 is a plan view similar to FIG. 6 showing one of the piston assemblies aligned with the first exhaust port.

It should be noted that the spark plug for the combustion chamber is located at the outward end of each combustion chamber. It has been found that the actual burning of the fuel starts at the spark plug and propagates radially inward. Thus it is found that most poorly burned portion of the fuel is at the inward end of the cylinder. It will be observed that the exhaust openings 192-194 are also located near the radial inward end of the cylinder. Therefore when a given cylinder becomes aligned with the first exhaust port 551 in plate 550 (the block rotates clockwise as seen in FIG. 6) the most poorly burned portion of the combustion products will be removed via the exhaust port 551 and diverted back to the intake section of the engine. FIG. 7 shows a cylinder as having just passed the center of exhaust port 551 and starting into alignment with port 552 (as seen in FIG. 6). Since port 552 is connected to the exhaust pipe 562 the combustion products passing through port 552 are discharged to the atmosphere.

In the embodiment illustrated I have discovered that it is also advantageous to couple the exhaust port 555 back to the intake manifold, and thus this arrangement is illustrated in FIG. 3. It will of course be evident that the engine can actually be tuned by selecting various ports for the feedback of combustion products to the intake manifold. When the engine is used with an arrangement such as described in FIGS. 1 and 2 of my prior referenced application, the arrangment of feeding the exhaust port 555 back to the intake manifold is particularly advantageous since it will be seen that in that emobidment the exhaust opening 555 is partially aligned with the intake ports of a given cylinder during the time when the cylinder is being charged with air and fuel. Thus complete charging of the cylinder can be accomplished with any through-flow of fuel being fed back to the intake instead of being wasted.

An additional advantage of the engine is that through the use of the small steel plates 567 for blocking a given exhaust port 551-555, the engine can be used for the secondary burning type of operation disclosed and explained in detail in the above-identified copending application, or for the recycling type of operation. When it is desired to use the engine in the secondary burning mode of operation, a steel plate 567 is used to cover the first exhaust port 551. Other ports can then be used for the recycling function. It is obvious that control valves can be inserted in the individual exhaust pipes to permit selection of the specific ports to be used in the recycling operation. Thus the exhaust products from exhaust pipe 562 can be monitored during engine operation with the various ports for feedback being selected to achieve maximum burning of the fuel and minimum output of pollutants.

It is belived that the use of the recycling mode of opertion described herein will materially reduce the exhaust pollutants being discharged to the atmosphere, and therefore, not only increase engine efficiency but also have an important impact on internal combustion engine exhaust pollutant problems. While the engine runs well without any coolers in the exhaust pipes leading from the exhaust ports 551 and 555 to the air intake, it is obvious that finned coolers in these lines could be utilized.

What is claimed is:

1. An internal combustion engine comprising in combination: An air intake means for said engine; a plate having a plurality of exhaust ports therein; a crankshaft; means interconnecting said plate and said crankshaft and holding the same against relative movement; cylinder block means having means defining a plurality of combustion chambers extending radially outward from a common point, each of said combustion chambers having means defining at least one air intake opening in the circumference thereof and communicating with said air intake means, and at least one exhaust opening rotatably aligned with said exhaust ports in said plate; means supporting said block means adjacent said plate and for rotation relative to said crankshaft; and a plurality of pistons disposed in respective combustion chambers and each piston having connecting rod means associated therewith and connected to said crankshaft, each of said pistons disposed to move from one end of the respective combustion chamber to the other during rotation of said block thereby covering and uncovering the intake and exhaust openings in the combustion chamber wall; said plurality of exhaust ports arranged such that said exhaust openings of each combustion chamber will pass into alignment with each of said plurality of exhaust ports from one exhaust port to another as each piston, in each respective combustion chamber, moves in a respective combustion chamber to uncover said exhaust openings and intake openings; and exhaust pipe means connected to said plate and covering said exhaust openings and including a first pipe connecting at least one of said exhaust openings with said air intake means; whereby the most poorly burned portion of the combustion products may be selectively recycled from an appropriate one of said exhaust ports and into said air intake means for combustion in said combustion chambers.

2. The apparatus defined in claim 1, including first blower means coupled to said block and driven thereby and adapted to deliver air under pressure into said air intake means; second blower means applying air under pressure to said first blower means; and wherein said first pipe is connected from an exhaust port to a location between said first and second blower means.

3. The apparatus as defined in claim 2, wherein: said block means has a circumferential groove disposed around at least a portion of the circumference of each of said combustion chambers starting from an area of radial alignment with said air intake means, and each of said combustion chambers includes a sleeve member having a plurality of air intake openings disposed in alignment with said groove.

4. The apparatus of claim 1, wherein: the said intake and exhaust openings of each of said chambers are at least partially disposed in opposite sidewalls of the respective chamber and radially aligned to permit through-flow of air during the exhaust cycle.

5. The apparatus of claim 1 including plate means blocking at least one of the said exhaust openings.

6. The apparatus of claim 1 wherein said means defining said combustion chambers comprises a cast block portion having diametrically opposed intake and exhaust openings therein, and a sleeve member secured in each said portion with each sleeve member having diametrically opposed intake and exhaust openings.

7. The apparatus of claim 1, wherein: said first pipe is coupled with the first exhaust port with which said combustion chambers become aligned after an explosion in the chamber.

8. The apparatus of claim 1, including fuel input means for providing a mixture of air and fuel to said chambers through at least one opening in said air intake means.

9. The apparatus of claim 1, wherein: said exhaust pipe means includes a second pipe connecting a second one of said exhaust ports to said air intake means.

10. The apparatus of claim 1 including fuel injection means coupled with each of said cylinders and operative to supply pressurized fuel to the interior of each chamber at a selected time during rotation of said block means, said fuel injection means including individual control valve assemblies associated with each of said chambers and each having a fuel line connected thereto and extending to a point adjacent said crankshaft, and fuel distributor means secured to said crankshaft and having an opening therein which is sequentially aligned with said fuel lines as said block means rotates, said fuel distributor means inclduing an elongated member having a splined end, a fuel line extending longitudinally to an interior point of the member, and a radial fuel line terminating in an open end which is sequentially aligned with the ends of the said fuel lines connected to said control vlaves; and wherein one end of said crankshaft has a splined opening for receiving the splined end of said elongated member.

11. The apparatus of claim 1, including a plurality of electrically actuated ignition devices each having a portion extending inside one of said chambers and including conductive terminal means for receiving an electrical signal, and means defining a conductive ignition electrode maintained stationary relative to said conductive terminal means sequentially cooperable with said terminal means as said block means rotates relative to said first plate.

12. The apparatus of claim 9 wherein said second pipe is coupled with one last exhaust opening to which the interior of a combustion chamber is exposed during rotation of said cylinder block means.

13. The apparatus of claim 1, including a thin walled substantially flat bearing and sealing member secured to said plate, said bearing and sealing member and said block means having mated upstanding and depressed portions which are mutually re-entrant to form a seal extending around a circumference on said plate.

14. An internal combustion engine comprising, in combination: Air intake means; a plate having at least two exhaust ports therein; a crankshaft; means interconnecting said plate and said crankshaft and holding the same against relative movement; cylinder block means having means defining a plurality of combustion chambers extending radially outward from a common point, each of said combustion chambers having means defining at least one intake opening in the circumference thereof, aligned radially with the said air intake means and at least one exhaust opening in the circumference thereof aligned radially with said exhaust ports in said plate; means supporting said block means for rotation relative to said crankshaft; exhaust pipe means selectively coupled with one of said exhaust ports and with said air intake means and operative to apply a part of the most poorly burned engine exhaust gases passing through said exhaust openings back into said air intake means.

15. The apparatus of claim 14, including air blower means coupled with said air intake means and wherein said exhaust pipe means includes at least two separate exhaust pipes with one of said pipes extending directly from an exhaust port to said air intake opening means.

* * * * *